3,173,943
CATALYTIC METHOD OF PREPARING
TERTIARY ESTERS
Howard V. Hess, Glenham, and George W. Eckert, Wappingers Falls, N.Y., assignors to Texaco Inc., New York, N.Y., a corporation of Delaware
No Drawing. Filed Nov. 15, 1961, Ser. No. 152,611
2 Claims. (Cl. 260—497)

The present invention relates to a catalytic method for the preparation of carboxylic acid esters of tertiary alcohol and more particularly to such a method where a "tertiary-olefin compound" is reacted in an esterification zone with a carboxylic acid in the presence of a monobasic fatty acid having at least 1 and up to 3 halogen atom substituents on the alpha carbon.

The tertiary-ester products of the method of the invention are useful as solvents for many organic materials and therefore are useful vehicles therefor. One such ester, t-butyl acetate, is particularly important in that it is useful as a paint solvent, lacquer component and also is a valuable additive for improving the octane rating of high quality leaded gasoline.

The condensation of a tertiary-olefinic compound with a carboxylic acid is normally performed in the presence of a catalyst. Some of the catalysts employed in the past were sulfuric acid, complexes of boron trifluoride, orthophosphoric acid suitably supported on an inert support such as kieselguhr, benzenesulfonic acid and alkyl sulfates. These prior methods utilizing the foregoing catalysts, although satisfactorily producing the tertiary-ester in many respects, generally entertain a serious competing reaction, namely, that of polymerization of the tertiary-olefinic reactant. The formation of polymers, of course, undesirably reduces yield, gives polymer contamination of the product ester and often does not permit economical recovery of the tertiary-olefin reactant from the polymer. One advantage of our method over the conventional methods of preparing tertiary esters from tertiary-olefin is that in our method polymerization is held to a minimum.

In accordance with the foregoing, we has discovered that the alpha halogenated monobasic fatty acids are effective in catalyzing the reaction between a tertiary-olefinic compound and an unsubstituted carboxylic acid to form the tertiary-ester. In addition, we have discovered that the halogenated monobasic acids contemplated herein do not promote undesirable polymerization of the olefin.

In a typical operation of our novel method, the tertiary-olefin is contacted with the carboxylic acid in a mole ratio of between about 5:1 and 1:5, preferably between about 2:1 and 1:2, at a temperature between about 40 and 150° F., preferably between about 60 and 125° F., and under a pressure of between about 10 and 200 p.s.i.g., preferably between about 40 and 150 p.s.i.g., in the presence of between about 0.1 and 30 mole percent preferably between about 1 and 10 mole percent based on the total moles of said olefin and acid, of a halogenated $C_2$ to $C_{18}$ monobasic fatty acid having 1 to 3 halogen atoms attached to the alpha carbon. It is to be noted the presence of three halogens on the alpha carbon is only possible when the acid is acetic.

In the method of the invention, the halo-fatty acid catalyst reacts in part with the olefin reactant to form the corresponding haloester. For economic purposes, it is desirable to recover the tertiary-olefin reactant and halo-fatty acid catalyst from the haloester. This may be accomplished by heating the separated haloester at a temperature between about 200 and 350° F. to reform the halo-fatty acid catalyst and tertiary-olefin reactant. The regenerated products may then be recycled to the reactor for further use.

The novel method is operative whether the reactants and catalyst be in the liquid phase or mixed liquid and vapor phases. In any case, it is desirable that they be thoroughly mixed prior to or during the reaction period in order to insure high yields of ester product.

The method can be either continuous or batch. If a continuous operation is employed, it is desirable to admix the reactants and catalyst with one another prior to their exposure to the reaction zone. In such a system, the admixture can be fed into the reactor zone at a temperature less than what is found in a major portion of said zone and then allowed to reach reaction temperature. Also, the reaction mixture is continuously withdrawn from the reaction zone. The components comprising the withdrawn stream can be separated from one another by any standard means such as fractionation.

Our method may also be a combination of batch and continuous methods. Under these conditions the reactants, catalyst and formed products are passed through the reaction zone and continuously recycled therethrough with batch or incremental withdrawal of the reaction mixture for separation of the tertiary-ester product therefrom and the decomposition of the haloester by-product followed by the recovery and return of the decomposition products to the circulating reaction system.

Corrosion resistant vessels are in order, for example, ones of austenitic stainless steel, high chrome stainless steel and the like because of the corrosive tendency of the reactants and catalyst.

By the term "tertiary-olefinic hydrocarbon," we intend a hydrocarbon containing one tertiary-olefinic carbon. The useful olefinic starting materials for our method have at least one side chain branching from an olefin carbon (including an olefinic carbon atom in a cyclic structure). Specific examples of the suitable olefinic hydrocarbons for use in our method include isobutylene, 2-methyl-1-butene, 2-methyl-2-butene, 3-methyl-3-heptene, 3,4-dimethyl-3-decene and 1-methyl-1-cyclohexene. As a practical limitation because of the cost and availability the aliphatic $C_4$–$C_{12}$ tertiary-monoolefinic hydrocarbons are the most desirable for our process.

The olefins can be pure, mixed with each other or mixed with unreactive or substantially less reactive materials. Thus, for example, we can use pure isobutylene made by cracking an isobutylene dimer. On the other hand, we can use a $C_4$ and/or $C_5$ cut from a catalytic or thermal cracking operation which would contain somewhat less than 20% of the tertiary-olefin and the balance of other diluent hydrocarbons. A typical so-called "B-B" (butane-butene) stream from catalytic cracking can contain 10–25 mole percent isobutylene, 50 mole percent butanes and the balance preponderantly butene-1 and cis- and trans-butene-2. A suitable stream for making tertiary-butyl carboxylic acids is a stream containing about 25 mole percent butylenes and the balance predominantly normal butane.

The carboxylic acid reactant is the monobasic fatty acids ranging from formic to stearic acids ($C_2$–$C_{18}$) and advantageously the $C_1$–$C_8$ fatty acids. Alternatively, the carboxylic acid reactant can be the dibasic fatty acids, desirably the $C_2$–$C_{18}$ aliphatic hydrocarbon dibasic acids with the $C_4$–$C_{12}$ dibasic acids being preferred. Typical examples of the carboxylic acids of the invention include formic, acetic, propionic, butyric, isobutyric, valeric, isovaleric, 2-ethylhexanoic, caprylic, octanoic, oxalic, malonic and sebacic.

Examples of halo-fatty acid catalysts contemplated herein are monochloroacetic acid, dichloroacetic acid, trichloroacetic acid, alpha-bromocaprylic acid, alpha-difluorolauric acid, and alpha-iodopalmitic acid.

To facilitate the contact of reactants and catalyst the reaction can be conducted in the presence of an inert liquid vehicle, e.g., ether, benzene, toluene or the like.

The following examples illustrate the invention and should not be construed as a limitation thereof.

Example I

This example recites one of the procedures encompassed by the invention.

To a 2-liter stainless steel draft tube reactor there were added 225 grams (3.75 moles) of acetic acid, 225 grams (1.37 moles) of trichloroacetic acid and 400 grams (7 moles) of isobutylene. The reaction mixture was stirred for a period of 2 hours and maintained at a temperature between 68–72° F. under an isobutylene pressure of 50–51 p.s.i. At the end of the 2 hour period, the reactor was vented and the liquid reaction mixture remaining therein was successively washed with about 3 liters water, about 0.5 liter of 5–10 wt. percent aqueous sodium carbonate and about 3 liters of water. The washed product was then fractionally vacuum distilled at 2.7–7.0 mm. Hg and 187 grams representing a 42.9 mole percent yield based on the acetic acid reactant of tertiary-butyl acetate was recovered at 108 to 139° F. In addition, 120 grams of tertiary-butyl trichloroacetate was recovered as the distillation residue. Still further, no polymer resulting from the polymerization of the olefin reactant was found.

Example II

This example illustrates the importance of maintaining the reaction temperature within the desirable range.

To a 2-liter stainless steel draft tube reactor there were added 300 grams (5 moles) of acetic acid, 672 grams (12 moles) isobutylene and 163.5 grams (1 mole) of trichloroacetic acid. The reaction mixture was stirred for a period of 5½ hours at a temperature between 150–200° F. under an isobutylene pressure of 75–140 p.s.i. At the end of the 5½ hour reaction period, the reactor was vented and the liquid reaction mixture remaining therein was successively washed with about 4 liters water, about 0.6 liter of 5–10% aqueous sodium carbonate and about 3 liters of water. The washed product was then fractionally vacuum distilled at 4–4.8 mm. Hg and 34 grams, representing a 6 mole percent yield of tertiary-butyl acetate based on the acetic acid reactant, was recovered at 135 to 222° F.

A comparison of the yeld of the present example with that of Example I illustrates the significance of maintaining the temperature within the desired range.

Example III

The procedure of Example I was essentially repeated except the trichloroacetic acid was not employed. At the end of the reaction no sifinificant amount of tertiary-butyl acetate was recovered.

Example IV

The procedure of Example I was repeated except acetic acid was deleted from the reaction mixture. The final reaction product consisted primarily of tertiary-butyl trichloroacetate with no tertiary-butyl acetate detectably present.

Examples III and IV further demonstrate the necessity of the combination of the carboxylic acid reactant and halo-fatty acid catalyst to produce the desired tertiary-ester.

We claim:
1. A method of preparing a tertiary ester comprising contacting an aliphatic tertiary monoolefinic hydrocarbon of from 4 to 12 carbons with a carboxylic acid reactant of less than 19 carbons selected from the group consisting of saturated aliphatic hydrocarbon monocarboxylic acid and saturated aliphatic hydrocarbon dicarboxylic acid in the presence of a $C_2$ to $C_{18}$ saturated aliphatic hydrocarbon monocarboxylic acid catalyst having from 1 to all of the hydrogen radicals bonded to the alpha carbon substituted with halogen radical said contacting conducted at a pressure between about 10 and 200 p.s.i.g., at a temperature between about 40 and 150° F. in a mol ratio of said olefinic hydrocarbon: said carboxylic acid reactant of between about 5:1 and 1:5, said catalyst being present in a mol percent of between about 0.1 and 30 based on the total mols of carboxylic acid and hydrocarbon reactants, separating said tertiary ester and formed tertiary haloester from the reaction mixture and from one another, heating the separated tertiary haloester to a temperature of between about 200 and 350° F. to reform said catalyst and said olefinic hydrocarbon and recycling the regenerated catalyst and monoolefinic hydrocarbon to the initial reaction between said carboxylic acid reactant and said tertiary monoolefinic hydrocarbon.

2. A method in accordance with claim 1 wherein said catalyst is trichloroacetic acid, said hydrocarbon is isobutylene and said carboxylic acid reactant is acetic acid.

References Cited in the file of this patent

UNITED STATES PATENTS

| | | |
|---|---|---|
| 1,836,135 | Suida | Dec. 15, 1931 |
| 2,198,046 | Vierling | Apr. 23, 1940 |
| 2,775,633 | Fenske et al. | Dec. 25, 1956 |
| 3,014,066 | Kerr et al. | Dec. 19, 1961 |

OTHER REFERENCES

Fieser: Organic Chemistry, 2d ed. page 338 (1950).